United States Patent [19]

Powell

[11] Patent Number: 5,341,838
[45] Date of Patent: Aug. 30, 1994

[54] DIRECT SPRING PRESSURE OPERATED VALVE

[76] Inventor: Walter W. Powell, 13911 Emerald Forest, Sugarland, Tex. 77478

[21] Appl. No.: 109,968

[22] Filed: Aug. 23, 1993

Related U.S. Application Data

[63] Continuation of Ser. No. 822,891, Aug. 23, 1993.

[51] Int. Cl.$^5$ .................................. F16K 17/08
[52] U.S. Cl. .......................... 137/478; 251/284
[58] Field of Search ............... 137/469, 478; 251/284

[56] References Cited

U.S. PATENT DOCUMENTS

| | | | |
|---|---|---|---|
| 1,743,430 | 1/1930 | Coffin | 137/478 |
| 1,949,150 | 2/1934 | Eplett | 137/478 |
| 2,035,129 | 3/1936 | Hopkins et al. | |
| 2,597,057 | 5/1952 | Bergquist | 137/478 |
| 3,027,912 | 3/1962 | Carr et al. | |
| 3,854,494 | 12/1974 | Zahorsky | 137/478 X |

*Primary Examiner*—Stephen M. Hepperle
*Attorney, Agent, or Firm*—Bush, Moseley & Riddle

[57] ABSTRACT

A pressure operated safety or relief valve is set forth. It is constructed with a valve body enclosing a movable valve member positioned above a fixed cylindrical structure having a flow passage through it. A coil spring in a bonnet mounted above the valve member bears against the valve member and moves it into closure with a seat on the top of the cylindrical structure. The valve member includes a seal ring for sealing engagement with the seat for closure. When the valve member is opened, the valve member separates to permit pressure flow which then is directed through an annular gap between a surrounding skirt of the valve member and the exterior of a blowdown ring disposed on the cylindrical structure. The valve member snaps open, because with slight opening of the valve member, increased area beneath the valve member is acted upon by the inlet pressure to snap the valve member open. The area of such annular gap is varied with respect to the size of the flow passage through cylindrical structure so as to vary the pressure of escaping fluid in such gap. Such pressure is applied to the top of the valve member via a flow passage between the valve member and a surrounding sleeve. Pressure above the valve member causes the valve member to snap close then the pressure in this inlet drops to a predetermined level. The vented fluid is discharged through an outlet passage.

17 Claims, 1 Drawing Sheet

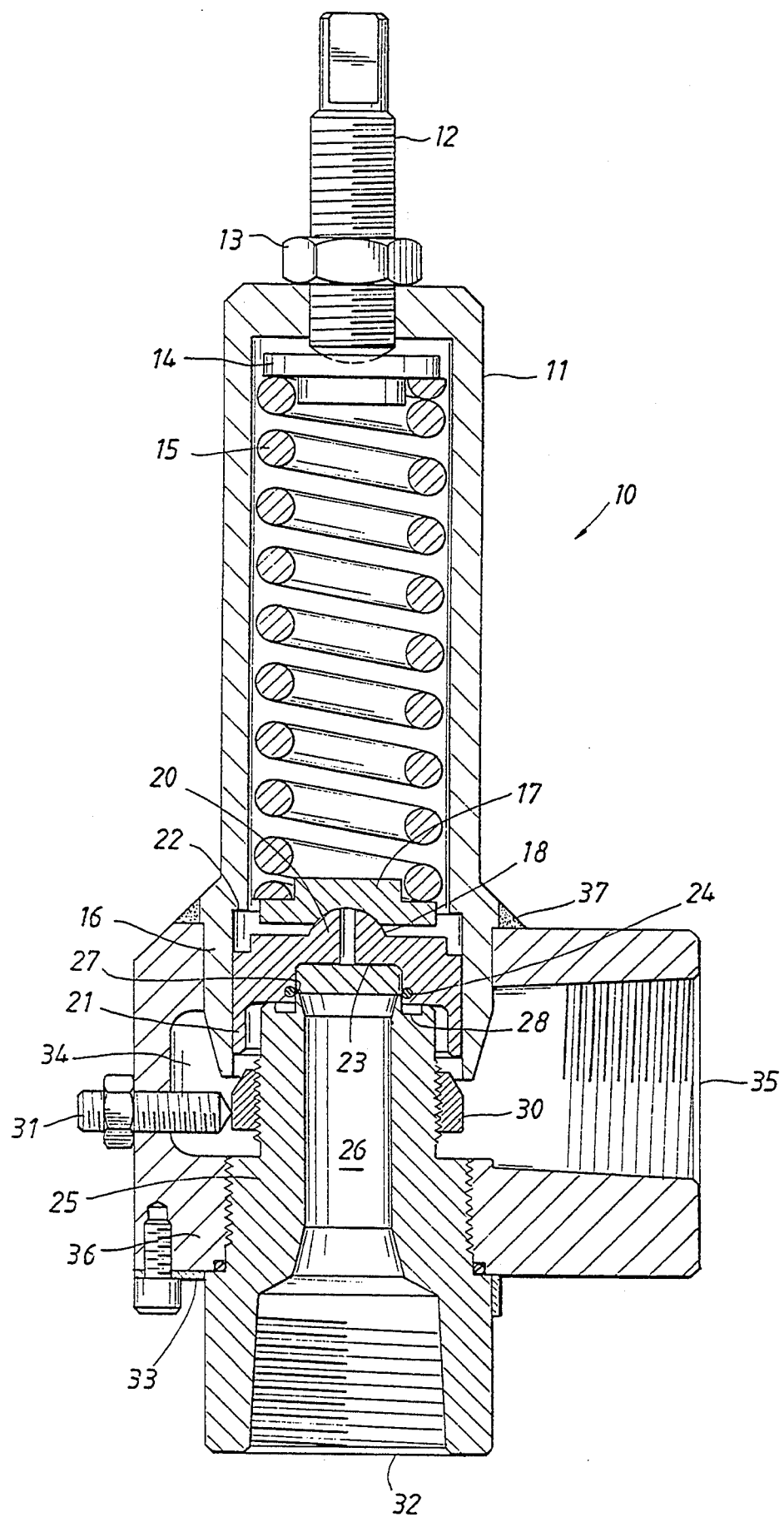

DIRECT SPRING PRESSURE OPERATED VALVE

This application is a continuation of U.S. patent application Ser. No. 07/822,891, filed Aug. 23, 1993.

BACKGROUND OF THE INVENTION

This disclosure is directed to a safety relief valve which finds application in relieving increased pressure in a tank or the like. It features a valve member which is directly acted on by a spring and which is also pressure operated so that it snaps open at a set pressure and stays fully open until blowdown pressure is achieved by a pressure drop of the fluid being vented. It does not partially close or throttle down while open. Closure occurs with snap action.

Closure is accomplished with a movable valve member having a soft closure member (a seal ring). The movable valve member and its seal ring is urged toward a valve seat while being accelerated to the closed position to provide snap closing action. An adjustable force is provided by a spring in combination with adjustable back pressure of a bonnet disposed above the valve member to control valve member closure. The safety valve therefore snaps open, stays open fully during venting, and snaps closed when blowdown pressure is achieved.

SUMMARY

The apparatus of the invention includes a valve body with an inlet which directs flow through an aligned orifice or passage of a cylindrical structure which opens about a valve seat area. The valve seat is defined by a thin annular surface or edge of such cylindrical structure adjacent the opening of such passage. The valve body supports an upstanding bonnet which encloses a compressed coil spring. Adjustments in the coil spring compression are made at the top end of the bonnet by means of an adjustive bolt. The bonnet is closed and captures vented fluid to achieve an elevated pressure to aid valve closing. The spring in the bonnet provides a downward closing force delivered to a movable valve member which supports a soft closure member, preferably a replaceable "O" ring, which on closure, seals against the valve seat of the cylindrical structure.

The force of the spring controls the set pressure, that pressure at which the valve opens. Set pressure is adjusted at the top of the bonnet by changing the compression on the spring.

At the upper portion of the cylindrical structure, exterior threads support a blowdown ring which is threaded for vertical movement. The blowdown ring may be threaded upwardly and downwardly on the cylindrical structure. The blowdown ring is locked in position by a suitable lock screw. The cylindrical structure and its annular seat are disposed in a cavity within the valve member. The valve member moves upwardly and downwardly with respect to the cylindrical structure and said annular seat.

In general terms, the safety valve of this invention holds pressure at its inlet in response to a spring controlled set pressure. The valve opens with snap action because an increased area beneath the valve member is acted on by the opening pressure beneath the valve member on initial opening. It stays open until pressure at the inlet has been relieved to a predetermined level. Thereafter it closes with snap action due to pressure transferred above the valve element during venting. Such pressure transfer is delayed to the bonnet or dome because of a small space between the valve member and a sleeve.

BRIEF DESCRIPTION OF THE DRAWINGS

So that the manner in which the above recited features, advantages and objects of the present invention are attained and can be understood in detail, a more particular description of the invention, briefly summarized above, is illustrated in the appended drawing.

The appended drawing illustrates only a preferred embodiment of this invention and is therefore not to be considered limiting of its scope, because the invention may admit to other equally effective embodiments.

The single drawing is a vertical sectional view through the improved safety valve of the present invention showing details of construction and in particular showing the valve in a closed position.

DETAILED DESCRIPTION OF THE INVENTION

Attention is now directed to the only drawing which is included with the present disclosure which illustrates a safety valve 10 according to the invention which operates with snap action on both opening and closing. Details of the operation of safety valve 10 is presented below.

Generally, the safety valve 10 is similar in construction to the valve disclosed in U.S. Pat. No. 3,411,530. That patent describes a pressure operated pop valve. The present valve is a snap acting safety valve which provides measurable improvements over the valve of the '530 patent. Moreover, a number of the components are of similar construction, but there are enhancements which will be detailed hereinafter. The only drawing therefore shows the valve 10 which incorporates an upstanding bonnet 11 which centers a spring adjusting bolt 12 at its upper end. The bolt is held in place by a locknut 13 which clamps a seal ring (not shown) in place to prevent leakage along the bolt 12. At its lower end, bolt 12 bears against a circular washer 14 which is provided with a flat which engages a compressed coil spring 15 confined within the bonnet. The bonnet 11 extends downwardly to a surrounding cylindrical extension or sleeve 16 which surrounds valve components as will be described.

The coil spring 15 at its lower end bears against a thrust washer 17, which also bears against a hemispherical enlargement 18 at the top of a movable spindle or valve member 20. The upwardly facing hemispherically shaped surface 18 cooperates with a downwardly facing hemispherically shaped surface of washer 17 to provide proper seating of such washer. The valve member 20 has a cylindrical external surface and terminates with a downwardly extending skirt 21. The skirt 21 is designed in cooperation with cylindrical structure 25 to define a flowpath as explained below. The valve member 20 fits within the downwardly extending concentric sleeve 16 which surrounds it.

The valve member 20 is free to move upwardly and downwardly within sleeve 16. Upward travel of valve member 20 is limited by an internal shoulder 22 of bonnet 11. Accordingly, the valve member 20 is free to move upwardly against the force of the coil spring 15. The sleeve 16 acts as an alignment mechanism to guide the valve member 20 in its movement.

The valve member 20 is formed with a recess at 23. A sealing ring 24 is positioned in a groove formed in the interior surface of recess 23. Thus, the diameter of the sealing ring 24 defines the cross-sectional area which is closed by operation of the valve 10. The recess at 23 is plugged with an insert which is concentric with the seal ring 24. Such insert completely plugs the valve member 20 so that pressurized fluid is held by the seal ring 24 when the valve member 20 closes to the illustrated position. This assures that there is no pressure fluid leakage to the bonnet cavity 11 when the valve 10 is closed. The insert in the recess is formed of any suitable material such as soft plastic capable of sustaining the ambient operating temperatures. The insert can also be a soft malleable metal capable of substantially plugging the recess 23. The insert may be removed by using a rod to force the insert from the recess when the rod is inserted through a hole in the valve member 20.

The valve member 20 moves above the cylindrical member 25 which defines an axial passage or orifice 26. The orifice 26 terminates at an annular surface or edge 27 which abuts against the sealing ring 24 and the insert to complete the sealing action. A circular groove 28 is provided in the exposed face of the valve member 20 and the cylindrical member 25. The groove 28 breaks up the flow pattern to avoid creation of the forces tending to close the valve member. The top of the cylindrical member 25 includes an abutting stop shoulder concentric around the groove 28 which stops closing or downward movement of the valve member 20. Such structure limits valve member movement and also prevents crushing of the sealing ring 24. Providing the sealing ring 24 and the positive stop shoulder structure assures reliable sealing even after many operations of the valve.

The skirt 21 is designed and dimensioned such that a space exists between its inner diameter and the outer diameter of cylindrical structure 25. The skirt 21 extends downwardly below the groove 28 and the adjacent concentric shoulder. Such space provides a flowpath for venting fluid. The annular edge 27 extends higher than does the metal shoulder adjacent groove 28. The height of annular edge 27 assures that the valve member 20 closes on a hard seat; the valve member 20 can have metal to metal loading of the shoulder adjacent groove 28 while sealing occurs by seal ring 24 sealing against annular edge 27. In other words, seating occurs, yet the seal is not required to carry the load. The load of the valve member resulting from the spring 15 is directed against the hard metal shoulder adjacent groove 28. The load is therefore directly transferred to the cylindrical structure 25 while the sealing ring 24 provides the fluid seal against annular edge 27.

The external surface of the cylindrical structure 25 is provided with threads, and a blowdown ring 30 is threaded on it. The ring 30 is locked in position by a lock screw 31 which prevents it from unthreading during operation. The position of blowdown ring 30 controls spacing in the gap or throat area surrounding the cylindrical structure 25. The blowdown ring 30 has a tapered exterior to provide a measure of streamlining to vented fluid flow and decreases blowdown adjustment sensitivity. Moreover, blowdown ring 30 is moved upwardly or downwardly to narrow or widen the gap between it and the fixed cylindrical sleeve 16.

An inlet 32 is provided at the lower end of the cylindrical structure 25. The inlet 32 is constructed with threads conforming to an industry standard. Such threads enable connection of the safety valve to a fluid flow line that directs fluid into the passage 26. The passage 26 has a cross-sectional area that provides regulation of the amount of fluid flowing during ordinary use. The inlet flowpath thus extends from the passage 26 to the top of cylindrical structure 25.

When the valve is opened, fluid flows past the seal ring 24 and downwardly between the skirt 21 and the exterior of cylindrical structure 25, and is directed radially outwardly by the blowdown ring 30 constructed with a streamlined or chamfered upper edge. The blowdown ring 30 directs flow into a surrounding or concentric cavity area 34. Such cavity area 34 opens into an outlet port 35 which is also internally threaded with a standard thread for easy connection to suitable exhaust lines. The outlet port 35 is constructed from a forging or casting having machined surfaces. This part of the safety valve 10 has the form of an encircling forging or casting identified at 36 to which the cylindrical structure 25 is threaded. Leakage around the top end of the casting 36 is prevented by placing a fillet weld 37 around the top interconnection. In a production model, the bonnet is typically formed integral with an outlet port 35 by means of known investment casting procedures.

The flow path of escaping fluid is directed into the chamber 34 and then flows out through the outlet opening 35. The outlet opening 35 is directed to atmosphere or into a fluid flow line for removal of vented fluid. As appropriate, suitable seals and 0-rings are included on the exhaust flow line. As appropriate, the safety valve 10 is assembled in the manner inferred by the threaded connections shown in the drawing.

DESCRIPTION OF OPERATION

The present apparatus may be described in operation with typical dimensions to describe its advantages. Assume that the orifice 26 has a nominal diameter of 1.287 inches which corresponds to a J-sized orifice in accordance with API standards. Other sizes of course may be provided by designers of safety valves. The orifice passage cross-sectional area normally defines the throughput of the valve, an important measure of its operation. Another aspect of importance to flow rate is the annular space controlled by the blowdown ring 30. Such annular space between the blowdown ring 30 and the adjacent downwardly extending sleeve 16 is significant to the operation of the safety valve 10. Such annular space cooperates with the dimensions and capacity of the bonnet 11 to vary bonnet pressure and, in turn, control blowdown. Bonnet pressure changes control the manner in which the valve member 20 moves within sleeve 16. Accordingly, bonnet pressure, controlled by the area of the space between blowdown ring 30 and sleeve 16, controls opening and closing characteristics of the valve.

Assume for purposes of illustration that the safety valve 10 is adjusted to open for release of pressure at 1000 psi. Assume further that the safety valve 10 is to remain fully open until closing is accomplished at 950 psi. Such example provides a five percent blowdown pressure differential. When the pressure at the inlet 32 of the safety valve 10 approaches the set pressure of 1000 psi, the downward force of the coil spring 15 is opposed by an upward force from fluid pressure in passage 26. Such upward force is equal to the inlet pressure multiplied by the area within the seal ring 24. When the upward and downward forces become equal, a small amount of escaping fluid flows past the seal ring 24 thereby increasing its pressure level at that point and generating an additional lifting force underneath the valve member 20 in the groove 28 which has a larger diameter than does the seal ring 24. Such added force overcomes the otherwise balanced force of the coil spring 15 and causes the valve member 20 to snap upwardly. The added force from flowing escaping pressure provides additional lift to the valve member 20 forcing it upwardly until it is stopped by the downwardly facing limit shoulder 22. The increased pressure existing upstream of the blowdown ring/body annulus is passed to the spring cavity, because pressure transfer is delayed by the clearance between the valve member 20 and sleeve 16. Such pressure quickly assumes equilibrium and acts downwardly on the valve member 20. For the example that the valve opens at 1000 psi and closes at 950 psi, the valve member 20 is held fully open, having moved to the open position in a snap action, and opening is sustained while fluid is exhausted. The flow rate at the full open exhaust position is determined by the cross-sectional area of the passage 26, because the area in the annular gap above and around the blowdown ring 30 is designed to be larger than the cross-sectional area of the passage 26.

The bonnet 11 is a closed chamber which is connected to receive fluid pressure above seal ring 24 of valve member 20. The valve member 20 fits somewhat loosely in the sleeve 16; there is clearance on all sides around the valve member 20 so that it may move upwardly and downwardly without binding. There is no seal provided around the outer diameter of the valve member 20 so that the pressure within the interior chamber of the bonnet 11 is raised. It is significantly important that the pressure fluid not fill the bonnet 11 instantaneously. The flow of vented fluid into the bonnet 11 increases the pressure on the top side of the valve member 20, thereby decreasing the pressure differential across the valve member 20 and the dynamic fluid force later required to close it.

The annular gap between the interior of sleeve 16 and the exterior of blowdown ring 30 is controlled by movement of the blowdown ring 30. The blowdown ring 30 is positioned to create an adjustable area which is greater than the cross-sectional area of the passage 26. Variations in such cross-sectional area, sometimes called a curtain area, controls the blowdown differential from about twenty-five percent of line pressure down to zero.

Closure of the open valve member 20 is accomplished substantially without throttling of its motion. The valve member 20 moves to the closed position without hesitation when the upward force due to fluid pressure beneath the valve member 20 is overcome by the downward force of the spring 15 and the pressure in the cavity of bonnet 11 acting on the top side of valve member 20. Closure is accomplished in crisp fashion to reseat at the desired blowdown pressure.

The valve 10 of the present disclosure can be constructed in various sizes. Adjustments of blowdown pressure are permitted for various models by virtue of changes permitted in the spacing around the valve member 20 when fully open relative to the blowdown ring 30. These changes enable the device to operate at different blowdown pressures. It may be necessary also to change the strength of the spring 15 or to adjust the loading of the spring so that the valve 10 can be made to open at a particular set pressure and to close at a particular percentage blowdown pressure. Such adjustments or changes provide a degree of flexibility and adaptability in the operation of the valve.

In operation, the initial pressure within the bonnet 11 is atmospheric pressure prior to any fluid release. Assume as an example that the line pressure is 1000 psi and that the valve opens at that pressure. There is a restricted flow in the space around the valve member 20 up into the bonnet 11. Depending on the size of the gap between the exterior of blowdown ring 30 and the interior of sleeve 16, the volume in the bonnet is raised in pressure rather quickly. This occurs while the valve member 20 slams upwardly against the stop or shoulder 22 which limits upward travel. Pressure therefore typically builds up in the region above the valve member 20 in a fraction of a second. Assume that the valve remains open for several seconds during blowdown. When the inlet pressure has been properly vented to the desired reduced pressure, two forces are applied to the top of the valve member 20 for closure. One is from the resilient spring 15 which constantly forces the valve member 20 downwardly. The second force is from the pressure captured in the bonnet and is equal to the upwardly facing effective cross sectional area of the valve member 20 and such pressure within the bonnet. This second force causes closure in rapid fashion so that the valve snaps shut. Even if it is desired that pressure be reduced by a large increment (e.g., 80%) then closure still occurs with a snap action movement because the valve member 20 is subjected to two forces as just mentioned. Such two forces add to overcome the opening force created by the inlet pressure acting on the downwardly facing side of the valve member 20.

The volume inside the bonnet is charged after the valve member 20 opens. This requires only a fraction of an interval to accomplish. The rate of pressure increase in the bonnet is dependent on the space between the valve member 20 and the sleeve 16. After closure of the valve member 20, the pressure charge in the bonnet 11 is released through the same space and also through the gap between blowdown ring 30 and sleeve 16. The movable valve member 20 does not play a part in this aspect. Further, the gap between the sleeve 16 and the blowdown ring 30 is controlled by repositioning the ring which, incidentally, enables control of valve response when exhaust outlet 35 back pressure is known.

The blowdown ring 30 is a means to control blowdown, namely, the pressure change between the initial pressure causing opening and the pressure on closing. The blowdown adjustment is made easily by rotating the blowdown ring 30, and then locking it in place after it has been positioned at the desired location. Accordingly, the valve blowdown change is contrary to that of prior safety valves on the market which provide an adjustable ring. More particularly, this inventive valve is contrary to the operation of prior art relief valves, where with this invention, valve blowdown increases when the blowdown ring 30 is moved away from the fixed sleeve 16.

While the foregoing is directed to the preferred embodiment, the scope of the invention is determined by the claims which follow.

What is claimed is:

1. A relief valve comprising:
   (a) a valve housing defining an inlet and an outlet;
   (b) a valve seat positioned within said valve housing between said inlet and said outlet;
   (c) a valve member coacting with said valve seat to close said valve seat and thereby shutoff communication between said inlet and said outlet, said valve member having a front side facing said valve seat and a back side;

(d) means urging said valve member into seated closure on said valve seat;

(e) said valve member being relatively moveable responsive to said urging means and to inlet pressure coacting on the front said of said valve member;

(f) a closed bonnet positioned to hold pressure acting on the back side of said valve element;

(g) said valve member having a central seating surface;

(h) an outer annular fixed sleeve attached to said housing and surrounding said valve member and defining an encircling flow area, wherein the flow area is the sole communication to said outlet from said inlet past said valve seat and said valve member;

(i) an adjustable flow control means comprising a moveable obstruction to control the flow through said flow are and to thereby create a back pressure within said bonnet; and (j) said sleeve being spaced slightly from said flow control means to provide a restricted passage therebetween so that back pressure created within said bonnet bleeds through said restricted passage on closure of said valve member.

2. The apparatus of claim 1 wherein said moveable obstruction comprises a ring upwardly and downwardly moveable, whereby said ring on downward movement increases blowdown.

3. The apparatus of claim 2 wherein said ring is constructed with an external chamfered shoulder to restrict vented fluid flow.

4. The apparatus of claim 2 wherein said ring is threaded onto a supporting nozzle in said housing, said nozzle having an axial passage from said inlet and to said valve seat.

5. The apparatus of claim 4 including means for locking said ring at a selected location.

6. A relief valve, comprising:
(a) a housing having an inlet and an outlet;
(b) a seat within said housing between said inlet and said outlet;
(c) a valve member movably coacting with said valve seat to prevent flow from said inlet to said outlet;
(d) said valve member having:
    (1) a front face contacting said seat; and
    (2) a back side;
(e) resilient means for producing a force for closing said valve member against said seat;
(f) an upstanding bonnet above said valve member and said seat
(g) said housing surrounding said seat with an encircling sleeve defining a concentric fluid flow are directed to said outlet;
(h) an adjustable flow means movably mounted to move toward and away from said sleeve to vary pressure build up in said bonnet after said valve member opens, wherein said pressure build up begins after opening of said valve member from said seat; and
(i) said flow means further controlling pressure drop in said bonnet while said valve member is open to enable said valve member to close in response to a closing force acting on said valve member from said resilient means and also a closing force formed by pressure build up in said bonnet to enable said valve member to close by overcoming an opening force formed by fluid from said inlet acting on said valve member.

7. The apparatus of claim 6 wherein said flow means is a ring threaded around said valve seat and moves on rotation.

8. The apparatus of claim 6 wherein said flow means controls pressure in said bonnet.

9. A relief valve, comprising:
(a) a housing having an inlet and an outlet;
(b) a seat within said housing between said inlet and said outlet;
(c) a valve member movably coacting with said valve seat to prevent flow from said inlet to said outlet;
(d) said valve member having:
    (1) a front face for contacting said seat;
    (2) a back side; and
    (3) a depending annular skirt surrounding said front face;
(e) resilient means for creating force directed to close said valve member against said seat;
(f) an upstanding bonnet above said valve member and seat;
(g) an encircling sleeve in said housing surrounding said seat to thereby define a concentric fluid flow area directed to said outlet;
(h) a first fluid flow path extending from said valve member to raise the pressure in said bonnet during opening of said valve member;
(i) a second fluid flow path from said bonnet extending to said housing outlet, said flow path providing venting to said bonnet of pressure fluid; and
(j) an adjustable flow means in said second flow path mounted to move toward and away from said sleeve, whereby movement away from said sleeve increases relief valve blowdown.

10. The relief valve of claim 9 wherein said skirt extends from said valve member surrounding the front face thereof and is larger than said valve seat so that said skirt extends over said seat to define a third fluid flow path which extends from said valve within said sleeve of said housing to the outlet thereof, and said third fluid flow path comprises at least a portion of said first fluid flow path.

11. The apparatus of claim 10 wherein said sleeve defines an internally located area for fluid from said inlet, said adjustable flow means coacting with said area so that movement of said adjustable flow means away from said sleeve increases relief valve blowdown.

12. A safety relief valve comprising:
a housing having an inlet and an outlet,
a seat provided upon a cylindrical structure within said housing, said seat positioned between said inlet and said outlet, said seat positioned at a height within said housing,
a bonnet secured to said housing,
a valve member having a front surface for contacting said seat and a back surface,
spring means disposed within said bonnet for forcing said valve member downwardly toward said seat,
a sleeve disposed within said housing and surrounding said seat to provide a concentric flow path directed toward said outlet, the distal end of a said sleeve extending downwardly past said height of said seat, and a blowdown ring mounted for adjustable height on said cylindrical structure, whereby an area defined by said distal end of said sleeve and said blowdown ring controls blowdown of said valve.

13. The safety relief valve of claim 12 further comprising a lift stop shoulder disposed in said housing dimensioned and designed to prevent overtravel of said valve member on opening of said valve member.

14. The safety relief valve of claim 12 wherein, said valve member fits within said sleeve for sliding movement relative to said sleeve where an outer diameter of said valve member is of a diameter smaller than an inner diameter of said sleeve thereby creating a passage for pressurized fluid to pass when said valve opens, whereby pressurized fluid which passes through said passage to said bonnet acts on said back surface of said valve to create a pressure closing downward force, which in cooperation with said downward force of said spring means tends to close said valve against an opening upward force of inlet pressure acting upon an effective area of said front surface of said valve member.

15. The safety relief valve of claim 14 wherein, blowdown is controlled by said pressurized fluid which passes to said bonnet is delayed in time from reaching said bonnet and said back surface of said valve from the time that said valve opens by a small size of said passage between said inner diameter of said sleeve and said outer diameter of said valve member.

16. The safety relief valve of claim 15 wherein, the pressure level of said pressurized fluid which passes to said bonnet is controlled by the position of said blowdown ring relative to said distal end of said sleeve.

17. The safety relief valve of claim 16 wherein, blowdown is decreased by increasing the height of said blowdown ring on said cylindrical structure, thereby decreasing the area between said blowdown ring and said distal end of said sleeve, thereby increasing the pressure of escaping fluid at such area which passes to said bonnet.

* * * * *